Dec. 1, 1936.  W. D. FARR ET AL  2,062,356
PROCESS FOR SEPARATING OIL FROM SLACK WAX
Filed Dec. 17, 1932  2 Sheets-Sheet 2

Warren D. Farr
Frank B. Samuel
Inventors
By W. E. Currie Attorney

Patented Dec. 1, 1936

2,062,356

UNITED STATES PATENT OFFICE 2,062,356

PROCESS FOR SEPARATING OIL FROM SLACK WAX

Warren D. Farr and Frank B. Samuel, Baton Rouge, La., assignors to Standard Oil Development Company, a corporation of Delaware Application December 17, 1932, Serial No. 647,722

5 Claims. (Cl. 196—20)

Figure 1:
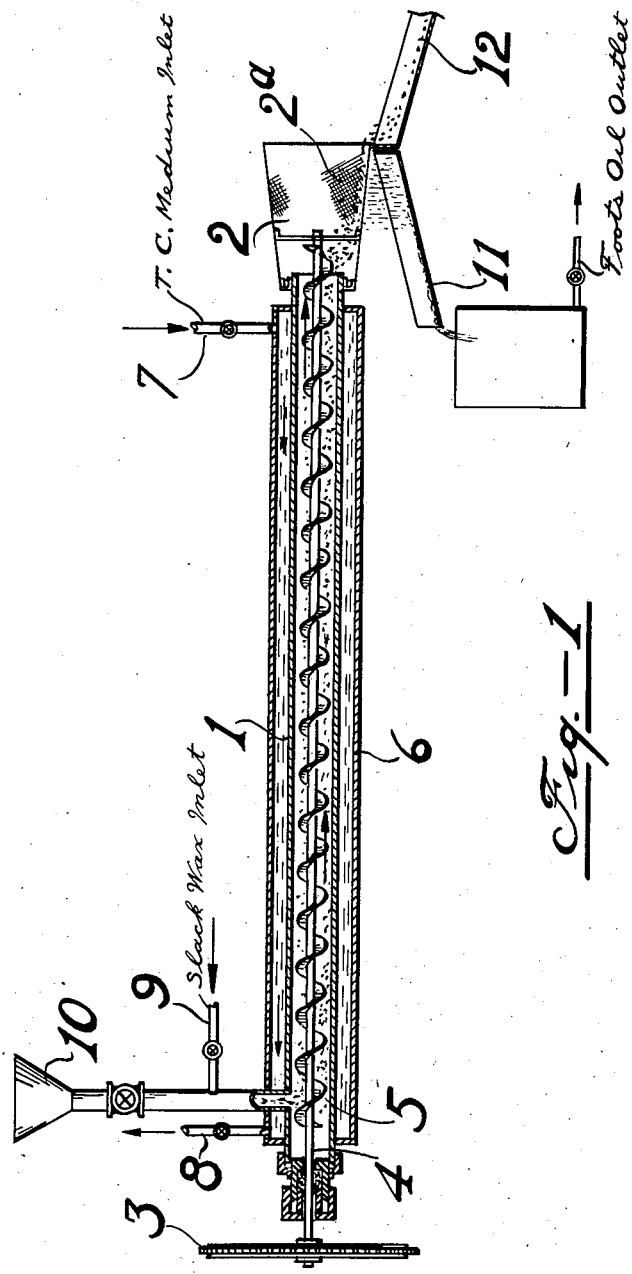
Figure 2:
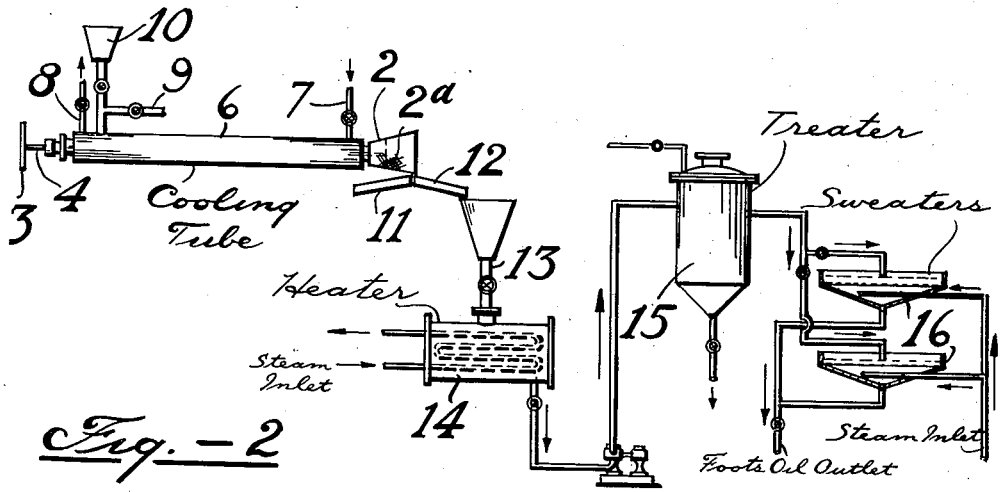
Figure 3:
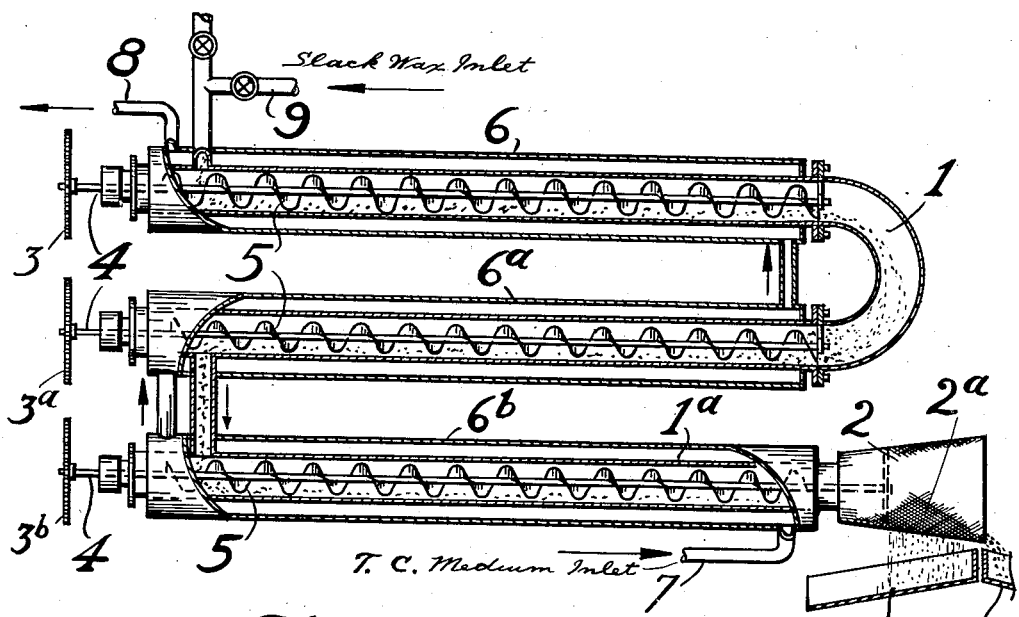

This invention relates to a process for removing oily constituents from slack wax and will be fully understood from the following description when read in conjunction with the drawings, Fig. 1 of which is a longitudinal section of part of the apparatus, Fig. 2 is a side elevation of the whole apparatus used in carrying out the invention, and Fig. 3 is a longitudinal section showing a modified form of cooling tube.

As is well known to those skilled in the art it is a usual refinery practice to obtain wax from a wax bearing petroleum distillate by chilling the distillate to a low temperature and then pumping it through a filter press in which a yellow soft wax containing a large amount of oily constituents is obtained. This wax is called slack wax and is freed from the oily constituents, the so-called foots oil, by charging it to shallow sweating pans, chilling it to a solid mass and then gradually raising the temperature, allowing the oily constituents to drain away. The slack wax is usually given a sulfuric acid treatment before being charged to the sweaters.

We have invented a simple method by which a considerable percentage of the foots oil is separated from the slack wax before the same is acid treated and sweated.

In accordance with the foregoing the main object of the invention is to increase the capacity of the sweaters.

Referring now to Fig. 1 which shows the oil-separating apparatus proper, the same will be described together with the method of operation.

The principal parts of the apparatus are: cooling tube 1 and screen 2. Power applied to wheel 3 turns shaft 4 which moves spiral conveyor 5. Temperature control medium enters the annular space between shells 1 and 6 from 7 and flows to the outlet 8. Slack wax enters the interior of shell 1 from either line 9 or hopper 10 and is moved countercurrent to the flow of temperature control medium to screen 2. The latter may be mounted on shaft 4 and moved thereby, or it may be moved by power from another source. The foots oil from the wax flows through the screen openings 2a into trough 11, which conveys the oil away. The wax gradually moves to the end of the screen 2, where it drops into trough 12, which conveys it away.

Power may be applied in various ways. A sprocket wheel 3 is shown on the drawings.

Fig. 3 shows a triple- or multi-tube cooler which may be used instead of the single tube cooler of Fig. 1. The several parts are designated by 6, 6a and 6b and the functioning of this cooler and conveyor will be understood when reference is taken to the description of Fig. 1.

The apparatus may be modified in different other ways. Thus, for example, the screen 2, which may be cylindrical or frustro-conical as shown in Fig. 1, may be replaced by any of the standard rotary screens or a vibrating table screen ("shaker") or a centrifugal screen, etc.

In carrying out the process the slack wax is preferably settled to remove BS and water. We find it is advantageous to carry out the settling before the slack wax is run through the de-oiling apparatus, since the presence of water and BS disadvantageously influences the separation of the oil from the wax. The slack wax is then pumped to the de-oiling apparatus while in the liquid state, i. e. while it is at some temperature above the average melting point of the waxes in the slack wax, say above 130° F. As it passes along the tube propelled by the conveyor and the feed pump its temperature is decreased at such a rate that it will reach the end of the tube or tubes at some predetermined temperature, say 85°-95° F. As the temperature changes occur during this passage, various waxy constituents are cooled below their melting point and become solids or semi-solids. The conveyor exerts varying pressure on these solids and semi-solids in transit and gives them a crumbly structure, so that only comparatively few pockets of oil are trapped within the wax. At the end of the tube the solid-semi-solid-liquid mixture falls upon the screen. The liquid passes through the screen and thus becomes separated from the solids and semi-solids. The motion of the screen tends to further crumble the wax structure releasing more oil. When the solids, with any adhering or trapped liquid, reach the end of the screen, they are discharged therefrom and submitted to acid treating, as will be described hereinafter. The temperature to which the slack wax has to be cooled before it is discharged on the screen will depend on the composition of the waxy constituents and cannot be stated in exact terms. The temperature of from 85-95° F. is given above mainly for the purpose of illustration. When new stocks are treated the best temperature is readily determined by a few experiments.

Referring now to Fig. 2, the partly de-oiled slack wax is passed by conveyor 13 or any other suitable means to heater 14 and pumped into the treater 15. The acid treatment has the purpose of improving the color of the final wax and is carried out at a temperature at which the slack wax remains liquid. Treating temperatures of from 130° to 136° F. and about 2 lbs/bbl. of 98% sulphuric acid often give a satisfactory result. The acid treatment is followed by the usual alkali wash and water wash.

The acid treated slack wax is then charged to the sweaters 16 in which the remaining foots oil is removed and the crude scale wax obtained.

The following example will illustrate our invention.

105 barrels of slack wax were melted and then settled. One barrel of BS and water separated out and was removed. The remaining 104 barrels of slack wax had a melting point of 103° F. and consisted of 50% oil and 50% wax. This slack wax was passed through the de-oiling apparatus and separated into 62.4 bbls. of 111° F. melting point de-oiled wax, and 41.6 bbls. of oil of 36.4° A. P. I. gravity and 95° F. cold test. The de-oiled wax was melted and acid treated at a temperature of 133° F. with 2 lbs. per barrel of 98% sulfuric acid. 3.1 bbls. were removed therefrom as sludge and the remaining 59.3 bbls. of de-oiled and treated wax were charged to the sweater pans. 48.2 bbls. of crude scale wax of 122° F. melting point (containing 1.8% of oil) were obtained together with a foots oil of 88° F. cold test. The 106° F. melting point intermediate obtained during the sweating operation was recycled to the sweater pans.

Our invention is not to be limited by any particulars given by way of illustration but only by the appended claims in which it is our intention to claim all novelty inherent in the process.

What we claim is:

1. The process of removing oily constituents from slack wax which comprises heating the slack wax to a temperature above its average melting point, gradually cooling the wax to a temperature below its average melting point while simultaneously subjecting the wax to a kneading action whereby the wax is alternately squeezed and allowed to expand as it is cooled to below its melting point, and then discharging the mixture of oil and wax onto a screen which allows the oil to drain off.

2. The process for removing oily constituents from slack wax which comprises heating the slack wax to a temperature above its melting point, passing the molten wax through a narrow elongated passageway wherein it is subjected to a kneading action, simultaneously progressively cooling the wax as it passes through the passageway so that at the exit it is at a temperature below the average melting point of the wax, and then separating the oil from the wax by draining through a screening means.

3. The process for removing oily constituents from slack wax which comprises heating the slack wax to a temperature above its average melting point, passing the molten wax through a narrow elongated passageway through which the wax is propelled by a screw conveying means and is subjected thereby to a kneading action, simultaneously progressively cooling the wax as it passes through the passageway so that at the exit it is at a temperature below the average melting point, then discharging the mixture of wax and oil onto a screening means through which the oily constituents can drain off.

4. Process according to claim 3 in which the partially de-oiled slack wax is submitted to a sweating operation to remove further amounts of oily constituents.

5. Process according to claim 3 in which the partially de-oiled slack wax is subjected to acid treatment and thereafter the acid treated product is subjected to a sweating operation.

WARREN D. FARR.
FRANK B. SAMUEL.